United States Patent
Hunter

(10) Patent No.: US 11,361,494 B2
(45) Date of Patent: Jun. 14, 2022

(54) METHOD FOR SCATTERING POINTS IN A UNIFORM ARBITRARY DISTRIBUTION ACROSS A TARGET MESH FOR A COMPUTER ANIMATED CREATURE

(71) Applicant: Weta Digital Limited, Wellington (NZ)

(72) Inventor: Philip Hunter, Wellington (NZ)

(73) Assignee: UNITY TECHNOLOGIES SF, San Francisco, CA (US)

( * ) Notice: Subject to any disclaimer, the term of this patent is extended or adjusted under 35 U.S.C. 154(b) by 0 days.

(21) Appl. No.: 17/127,105

(22) Filed: Dec. 18, 2020

(65) Prior Publication Data

US 2022/0130098 A1  Apr. 28, 2022

Related U.S. Application Data

(60) Provisional application No. 63/105,150, filed on Oct. 23, 2020.

(51) Int. Cl.
*G06T 15/04* (2011.01)
*G06T 17/20* (2006.01)
*G06T 11/00* (2006.01)
*G06T 15/00* (2011.01)

(52) U.S. Cl.
CPC ............ *G06T 15/04* (2013.01); *G06T 11/001* (2013.01); *G06T 15/005* (2013.01); *G06T 17/20* (2013.01)

(58) Field of Classification Search
None
See application file for complete search history.

(56) References Cited

U.S. PATENT DOCUMENTS

| 5,737,508 | A | * | 4/1998 | Feigenbaum | ........... G06F 30/18 345/442 |
| 5,764,233 | A | | 6/1998 | Brinsmead et al. | |
| 2005/0210994 | A1 | * | 9/2005 | Petrovic | ................. G06T 15/08 73/760 |

FOREIGN PATENT DOCUMENTS

| CN | 2007094628 A | 4/2007 |
| CN | 104537704 A | 4/2015 |
| CN | 110363859 A | 10/2019 |

(Continued)

OTHER PUBLICATIONS

Turk, Greg. "Re-Tiling Polygonal Surfaces." Proceedings of the 19th Annual Conference on Computer Graphics and Interactive Techniques—SIGGRAPH '92, 1992.

(Continued)

*Primary Examiner* — Michelle Chin
(74) *Attorney, Agent, or Firm* — Haynes and Boone, LLP

(57) ABSTRACT

A programmatic arbitrary distribution of items in a modeling system may be provided. To perform the distribution, a surface may be received, and a point count of application points associated with locations on the surface may be determined. A density map may be applied over the surface to assign a density to portions of the surface for the point count. Application points are then assigned to locations on the surface according to the density map and a scattering function of the point count, where the scattering function is based on one or more repulsion forces between neighboring points. The one or more repulsion forces are treated as pushing each of the neighboring point apart. Thereafter, the surface may be provided having the application points scattered across the surface based on the one or more repulsion forces.

21 Claims, 7 Drawing Sheets

(56) References Cited

FOREIGN PATENT DOCUMENTS

CN            109035410 B     8/2020
JP            2007094628 A    4/2007

OTHER PUBLICATIONS

Chang et al., "A Practical Model for Hair Mutual Interactions," ACM SIGGRAPH Symposium on Computer Animation (2002) [doi=10.1145/545261.545273].

International Search Report issued in PCT Application No. PCT/NZ2021/050011 dated Jul. 14, 2021.

* cited by examiner

METHOD FOR SCATTERING POINTS IN A UNIFORM ARBITRARY DISTRIBUTION ACROSS A TARGET MESH FOR A COMPUTER ANIMATED CREATURE

CROSS-REFERENCES TO PRIORITY AND RELATED APPLICATIONS

This application claims the benefit of, and priority from, U.S. Provisional Patent Application No. 63/105,150 filed Oct. 23, 2020, entitled "Method for Scattering Points in a Uniform but Randomized Manner Across a Target Mesh for a Computer Animated Creature."

The entire disclosure of the application recited above is hereby incorporated by reference, as if set forth in full in this document, for all purposes.

FIELD

The present disclosure generally relates to computer animation and tools for specifying objects in a virtual scene from which computer-generated imagery is to be generated and more particularly to a tool for specifying a procedurally-generated set of dispersed application points for feathers, hairs, or other surface objects on a three-dimensional simulation of a creature.

BACKGROUND

In real-world examples, a collection of like items comprising a large number of items might be distributed over a surface in a pattern that is arbitrary but somewhat uniform. For example, hair follicles on a surface of a head of a person or an animal might number in the tens of thousands and have placements that are somewhat arbitrary but are uniformly distributed with some constant density or with some relatively smooth density. For example, over one person's head, there might be regions of constant density except for a bald spot where the local density of hair follicles is much lower than another area of the head. In another example, there is often a higher hair density on the head of a person as compared to hands and there might be more densely packed, but smaller, feathers on a breast of a bird as compared to the large, but less densely packed, tail or wing feathers. Other examples of items that have positions relative to a surface might include feathers, fur, or other instances where there are a large number of items having placements on a surface or other environment.

There are many different situations where this is the case and so people have come to expect the presence of collections of items distributed in an arbitrary but somewhat uniform pattern. Consequently, when it comes to computer-generated imagery, such as still images depicting a virtual scene or an animation depicting a sequence of frames each depicting the virtual scene, often an imagery creator, such as an animator, might want to depict such a collection of items. For example, an animator might want to create a character (e.g., a person, character, animal, fictional or fanciful creature, and/or the like) having a feature comprising a large number of items placed in position, such as over a skin surface, where those items might be feathers, hairs, fur, and/or the like, with the positions forming a pattern that appears arbitrary, but somewhat uniform or somewhat following a density function over the surface.

Given that a large number of items might need to be placed and sized, this can be tedious for an animator to do. An animator could have a computer interface wherein an external shell of a creature is displayed and the animator manually inputs, for each item, an item position on the external shell and perhaps also an item size. This can be time-consuming and might not result in a desired arbitrary placement pattern that follows a density function over the surface.

For simple cartoons, the complexity can be ignored and perhaps an acceptable approach is to have an automated method of uniformly placing items in a grid pattern. However, as viewers have come to expect more complex visuals, there is a need for computer-driven placement of the objects in a more realistic fashion. Some of that computer-driven creature generation might rely on simulations and models to perform more realistic creature generation, movement, and animation.

SUMMARY

A computer-implemented method for programmatically specifying positions relative to an object, for each item in a collection of items, and perhaps also sizes of each item, in a three-dimensional (3D) image generation system is disclosed. The collection of positions might form a pattern that is, or at least appears to be, arbitrary and/or random. The pattern might be generated based on a programmatically-specified density function, perhaps specified by a density map representable in computer memory. The density function might be a uniform density function or a varying density function that might be smoothly varying or might be smoothly varying within some areas and discontinuous at some boundaries between areas.

The computer-implemented method may include, under the control of one or more computer systems configured with executable instructions, receiving a target mesh having one or more mesh attributes, wherein the target mesh comprises a surface and determining a point count, wherein an application point is associated with a location on the surface and the point count is a count of such application points in an application point set. The computer-implement method may further include applying a density map over the target mesh to assign a density to each of a plurality of portions of the surface wherein at least two of the portions are assigned different densities, assigning application points of the application point set to locations on the surface according to the density map and a scattering function, wherein the scattering function is based on one or more repulsion forces, effects of which are modeled as to a first application point and as to one or more neighbor points neighboring the first application point, wherein the one or more repulsion forces are treated as pushing each of the first application point and the one or more neighbor points apart, and providing the target mesh having the application points of the application point set scattered across the surface based on the one or more repulsion forces.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
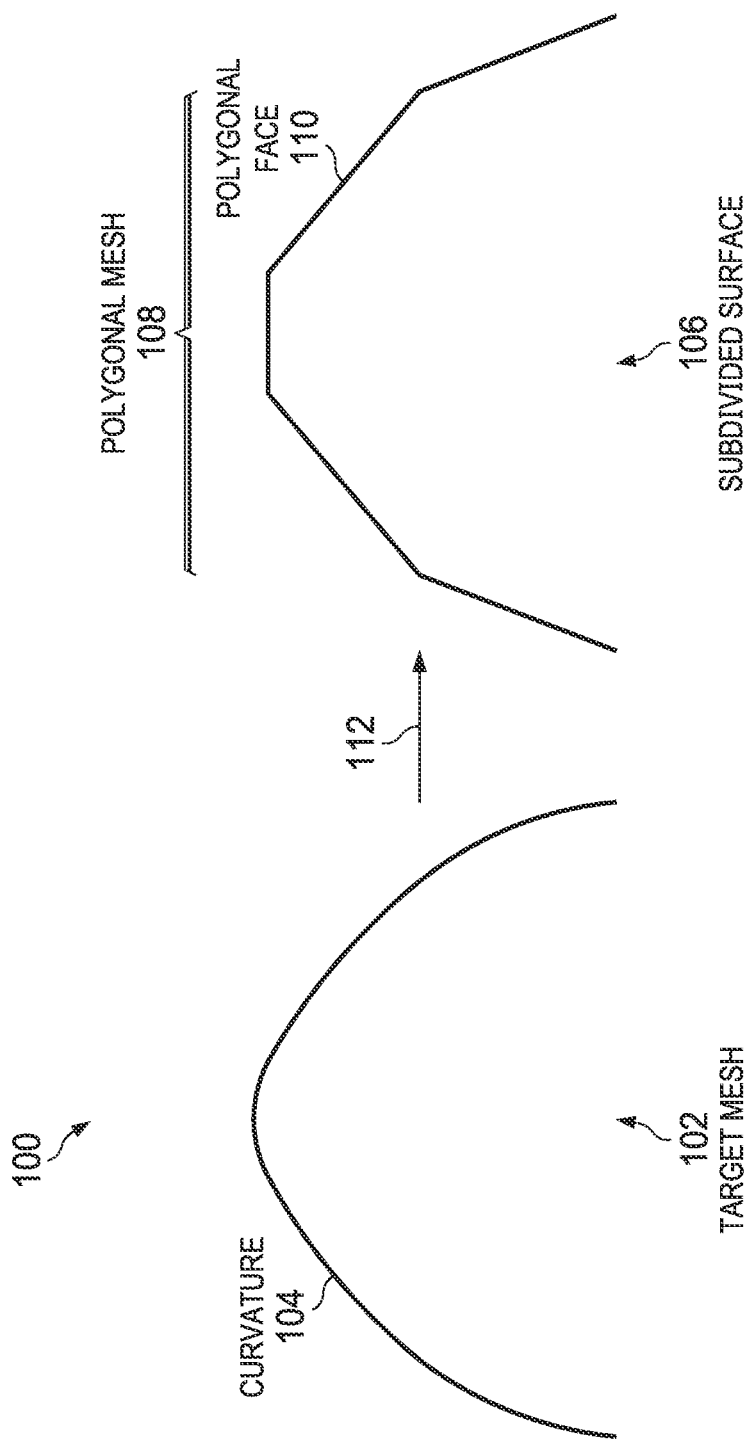
FIG. 1 illustrates an environment where a target mesh of a creature surface may be represented as a subdivision surface for use in placement of application points for external surface objects, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computer simulation that is used for creature generation may be used to animate creatures and natural movements of the creatures, such as by using a physics engine to output animations and movements of an articulated creature that are consistent with real-world physics and joint constraints. This may be done through one or more algorithms that attempt to automate this process of animating surfaces, body parts, and the like. For example, computer simulation and animation may be used to animate objects on a surface of a character by taking one or a subset of objects manually placed on the surface and attempting to place other similar objects on the surface through interpolations and other algorithmic approaches. In some ways, this is often a simple problem—how to determine natural-looking surfaces and surface objects of at most a few dozen attached objects on the surface. For other simulations, such as those with flexible objects, animal coats or pelts, and the like, the number of degrees of freedom of individual units is much greater and typically computer simulation requires a trade-off between realism, resolution, and amount of computing resources available. Because of this trade-off, efficient computer simulation techniques can be important as they might allow for an increase in realism and/or resolution without requiring significant increases in computing resources.

Thus, creatures generated and animated can be created in computer-readable form procedurally or manually. For example, an image of a sphere might be generated procedurally from a user input of a center location, a radius parameter, and a color. In another example, a more complex object might be generated procedurally from a set of parameters and a set of procedural rules for object creation. Objects might also be created manually, such as by having an artist draw into a computer system the shape of an object. In some cases, an artist might manually adjust a procedurally-generated object and place external objects on that object (e.g., feathers, hairs, fur, and the like), or may utilize algorithmic approaches with initial input. Conversely, if the points are numerous, such as with feathers and pelts of animals where the points may be thousands or more, placement of these points is time consuming and difficult, if not impossible, to perform manually, which affects creature realism.

Realistic placement of surface objects can be provided on a three-dimensional (3D) animated creature, such as a coat, pelt, fur, or feather groom of a creature, by randomly but uniformly distributing application points over a target mesh of the creature. The target mesh corresponding to the creature is provided as an input to a computer animation and simulation system for 3D creatures (e.g., humans, animals, fictional creatures, and the like). The target mesh includes multiple different features and attributes, such as different curvatures, sizes, shapes, deformations, and the like of surfaces for the mesh. Further, the target mesh may include a bind-pose mesh attribute and an active mesh attribute that allows for animation of the target mesh and determination of position calculations with the target mesh without recalculation during animation. The target mesh may further correspond to a subdivision surface that attempts to represent a smooth surface through the use of a polygonal mesh. Although one or more subdivision surfaces are described herein as the portions that make up the target mesh, it is understood that the target mesh may also be made of different polygons, non-uniform rational basis splines (NURBS), an implicit surface, a network of NURBS patches, of other types of surfaces including bicubic surfaces, quadratic surfaces, and the like.

In examples described herein, the programmatic placement of items of a collection of items over a surface or the like is referred to as a random placement. It should be understood that placement could also be done in some arbitrary but not truly random or pseudorandom manner. Furthermore, in examples described herein, the placement is over a surface and positions that are programmatically generated are positions on the surface. However, in other examples, the positions could be relative to the surface but not on the surface, such as being positions that are below or above the surface by some specified distance.

The target mesh can thus be designated for a creature having surface that may be represented through the subdivision surface or manifold (e.g., a topological surface of the creature). In order to disperse and distribute external surface objects over the creature's mesh, such as the feathers, hairs, fur, or the like of the creature, application points are distributed over the subdivision surface for the target mesh. These application points may correspond to nodes, polygonal representations, and the like on or through a surface, such as follicle points or the like. Using the application points, an animated 3D feather, hair, or other animated surface coat may be attached and grown in the computer animation and simulation system. However, other types of points may also be used, for example, during the placement of armor, scales, or other external objects to a user. The computer animation and simulation system may receive a count or number of points to distribute over the subdivision surface such that a set of application points are distributed to different locations over the subdivision surface. Each application point may have a corresponding location once distributed over the surface according to a scattering function or algorithm. This count of the points may be controlled to adjust the number of points, and relative concentration or sparseness of the points, over a subdivision surface. Thus, each application point may be associated with one or more neighboring application points for attachment of fibers and the like over the surface. These neighboring application points may then be used for calculation and application of repulsion forces for uniform or semi-uniform but randomized placement of application points over the surface in a computer modeling system, as discussed herein.

The process of generating a set of application points could be an output of a computer procedure that has as its input a number of parameters, where a count of the number of parameters is smaller than a count of the number of application points in the set of application points, thus allowing for easier editing and replacement of a set of application points with an edited set of application points, wherein editing is done on the parameters and the computer procedure is performed.

A density map may be determined and applied over the subdivision surface in order to change relative concentrations and densities of application points at different areas of the subdivision surface. For example, more hair may be concentrated on a head than a hand, or more feathers may be located within a plume of a bird than a crest. Thus, the density map may control the local densities of the application points so that in certain areas or surfaces of the subdivision surface, more application points may be concentrated depending on the look of the creature. The density map may correspond to a heatmap of application point densities and may be input and/or assigned by a creature artist or other animator. The density map allows for pulling of more application points from the set of application points in different areas of the subdivision surface. The density map therefore allows for the animator to assign static, random, or artist-values to the mapping of the application point densities over the subdivision surface.

Using the application points of the application point set, the computer animation and simulation system may generate a uniform or semi-uniform dispersal of the application points over the subdivision surface. The application points are assigned locations over the subdivision surface by scattering the application points randomly and according to the density map using a scattering algorithm or function. This scattering function may utilize a random seed value to initially distribute the application points. The scattering function allows for approximately even distribution of the application points over the subdivision surface using the density map (e.g., by allowing certain areas to push or pull more points depending on the point count), where the scattering function further includes one or more repulsion forces that provide effects for one or more application points to be repulsed from one or more neighboring points.

The repulsion force(s) may, in effect, serve to push an application point apart from its neighboring application point(s), which may provide less clumping and/or sparse portions in order to achieve a randomized but uniform scattering of the points. The repulsion force(s) may utilize distance as a variable in their function(s) so that the repulsion forces may be stronger or weaker as a factor of distance between an application point and its neighboring point(s). For example, repulsion forces may utilize a mathematical function or model that replicates a force that would push two or more points apart with respect to each other. This function may be linear, exponential, or otherwise decrease as distance increases (thereby increasing at closer distances). Further, the repulsion forces may operate with respect to their nearest application point neighbor or neighbors in order to apply the repulsion forces between application points. The repulsion forces may also or instead consider a proximity distance over the surface in an animation space to apply the forces between the application points. Other factors may also adjust the repulsion forces' strength or intensity, including the density map, the corresponding follicle and/or external surface object (e.g., for thin versus thick feathers or hair), and the like. In further embodiments, attraction forces may also or instead be used with repulsion forces to pull one or more application points toward neighboring application point(s). This may be used in combination with repulsion forces to obtain a desired scattering effect and/or randomized point distribution.

During post-processing, a paintable baldness UV mapping may be used with the application points and subdivision surface in order to get rid of points on the subdivision surface where the points are unwanted. For example, an animator may choose to remove all follicle points from the hands or feet of a character, or the talons and feet of a bird. The UV mapping may be obtained, and baldness portions identified in order to remove points from those portions. Thereafter, the target mesh may be output where each application point is represented as a simple box face. The original point for the box face may be in the center of a plane of the subdivision surface, and within a point cloud on the plane from the scattering and repulsion forces. In various embodiments, the paintable baldness UV mapping may be applied prior to placement of fibers or other external objects at the application points, or may be applied later. For the latter, a computer modeling system may utilize a data structure that corresponds to a surface having distributed application points and/or fibers or objects placed at the application points. This may be used to rendered one or more images of a scene, where the images may be used to place fibers, surface object, textures or the like over another object.

An output of the modeling system might be a data structure defining placement or other details of points on a surface, where the placement and other details of the points are determined programmatically. That data structure can then be fed to another system as an input and could replace or reduce the need for manual creation and/or specification of the placements or other details, thus saving user input time. While understood that these techniques may be applied to computer animation systems, such as for 3D imaging and scene rendering, the techniques described herein may similarly be applied to other computer modeling systems. For example, modeling systems for 3D printing, video game animation, device or object prototyping, and the like may similarly require arbitrary but uniform or semi-uniform placement of particular application points, objects, data, or the like. In this regard, the aforementioned techniques may be applied for other virtual and/or real modeling systems.

FIG. 1 illustrates an environment 100 where a target mesh of a creature surface may be represented as a subdivision surface for use in placement of application points for external surface objects, in an embodiment. As illustrated there, environment 100 may be displayed by a computing device and computing display when animating a 3D creature, such as a human, animal, fictional creature, or the like. For example, the computing system may correspond to a computer animation and simulation system configured to animate external surface objects on a surface of a creature. The external surface objects may correspond to those objects that protrude from the surface of the creature, such as feathers, hairs, fur, and the like. When placing these external surface objects over a target mesh 102, a subdivision surface 106 of target mesh 102 may be used to determine location and placement of one or more application points that are used to attach or bind the external objects to the corresponding surfaces. For example, an application point may correspond to a follicle point in a modeling of a creature, which is used to attach an animated 3D feather, hair, or the like. In various embodiments, target mesh 102 and subdivision surface 106 of the animation of the creature partial shown in environment 100 corresponds to a computer animated 3D bird.

As shown in environment 100, target mesh 102 is shown as a curvature 104 for a creature, which may further have 3D shapes, contours, and curves within a modeling system. In order to represent curvature 104 and allow for placement of application points, a representation 112 provides subdivision surface 106 as a polygonal mesh 108 of polygon surfaces that make up subdivision surface 106. Polygonal mesh 108 of subdivision surface 106 corresponds to a coarser mesh of polygons that attempts to represent curvature 104. This may be done through taking an initial given polygon mesh and applying a refinement function to subdivide the surface of the given mesh into smaller surfaces and polygons. This may be applied one or more times, such as in an iterative process, to generate polygon face 110 and additional faces within polygonal mesh 108.

One or more approximating and/or interpolating functions or algorithms may be utilized in order to provide representation 112 of target mesh 102 as subdivision surface 106. Polygonal mesh 108 may allow for better or easier placement of application points by allowing for in-plane placement of box faces for the application points. Further, density maps may be applied more easily over subdivision surface 106 in order to designate areas for higher or lower densities of corresponding application points, and therefore attached external surface objects. Additionally, one or more UV mappings may be applied, such as a paintable baldness UV mapping, that may remove all or a subset of application points within areas of subdivision surface 106 where the points are unwanted.

Environment 100 might be implemented by software, interfaces, features and/or functionality of a computer system used by animators or others to specify details that can be used to generate computer-generated imagery such as images and sequences of video frames.

Figure 2:
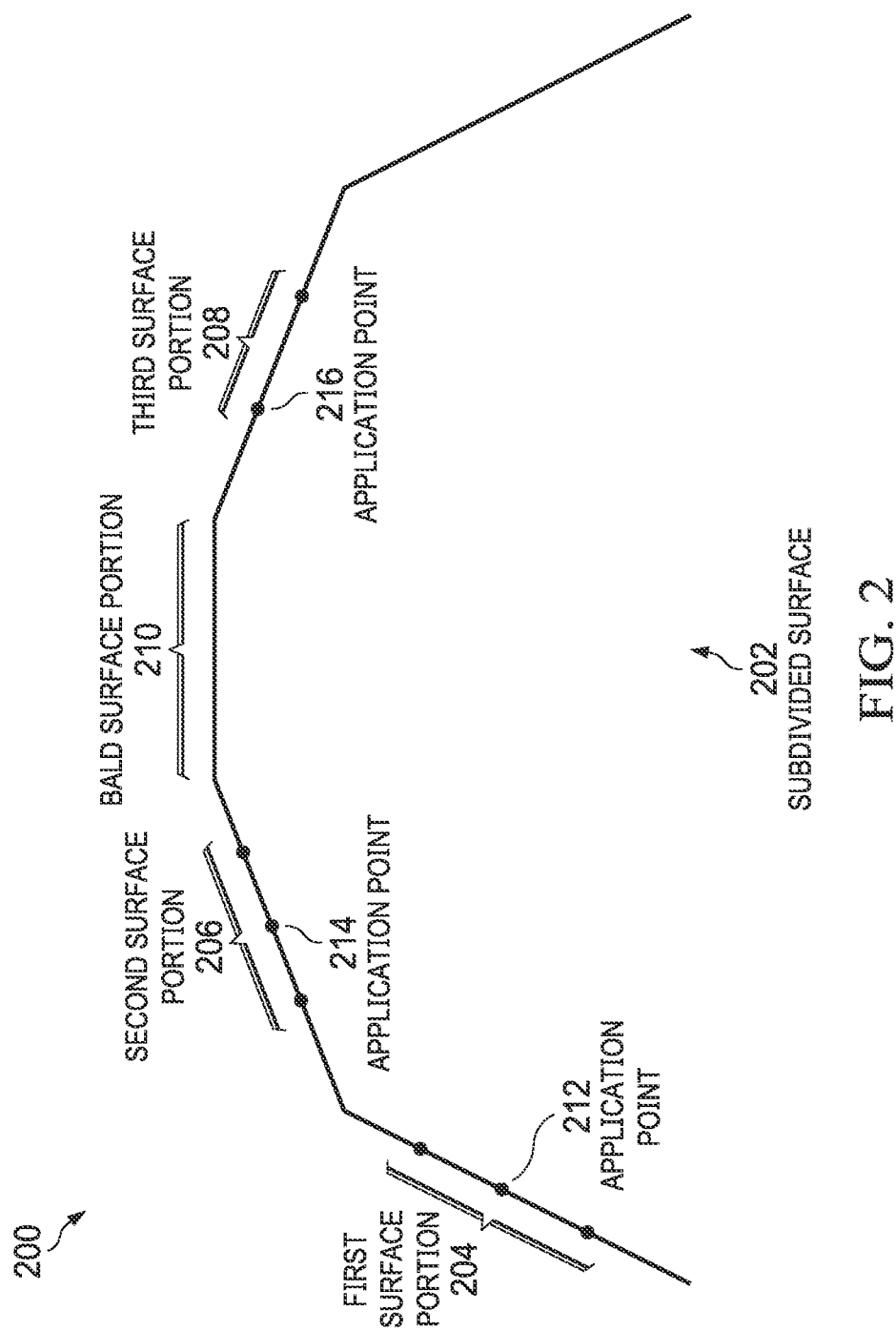
FIG. 2 illustrates an environment where a subdivision surface may have placements of application points performed through a scattering algorithm and density map, in an embodiment.

FIG. 2 illustrates an environment 200 where a subdivision surface may have placements of application points performed through a scattering algorithm and density map, in an embodiment. Environment 200 shows a subdivision surface 202 having application points, such as follicle points, distributed over the polygon faces and surfaces of subdivision surface 202, such as subdivision surface 106 that represents target mesh 102 in environment 100. Thus, as illustrated there, environment 200 may be displayed by a computing device and computing display when animating a 3D creature, such as a human, animal, fictional creature, or the like. For example, the computing system may correspond to a computer animation and simulation system configured to animate external surface objects on a surface of a creature. The external surface objects may correspond to those objects that protrude from the surface of the creature, such as feathers, hairs, fur, and the like. When distributing and assigning application points over subdivision surface 202, a scattering function may be used that includes repulsion forces between neighboring points in order to perform a more uniform and/or approximately even distribution of the application points over the portions of subdivision surface 202.

For example, in a first surface portion 204 and a second surface portion 206, the scattering function may be applied to an application point set having a point count of application points. The point count may correspond to a number or total of points to distribute over all or assigned surfaces of the creature. A density map may designate first surface portion 204 and second surface portion 206 as receive an equal or relatively equal number of application points for the application point set. Thus, first surface portion 204 and second surface portion 206 both are shown with three application points, or a distribution of six application points over the combined first surface portion 204 and second surface portion 206. When assigning locations on first surface portion 204 and second surface portion 206 to the designated application points of the application point set, the scattering function may be invoked to determine such locations. For example, an application point 212 may be assigned a first location on first surface portion 204 and an application point 214 may be assigned a second location on second surface portion 206.

When assigning the locations to application point 212 and application point 214 on first surface portion 204 and second surface portion 206, respectively, the scattering function or algorithm may utilize an initial random seed value to perform a scattering or distribution over subdivision surface 202. This scattering function may consider any density map to pull more application points in an area or push more application points away or out of an area. Once distributed across subdivision surface 202, such as over the polygonal mesh and faces of subdivision surface 202, one or more repulsion forces may be applied as a mathematical function or algorithm to cause nearby and/or neighboring application points to be repulsed from one another or pushed apart into a more even distribution of the points (e.g. to avoid clumps and sparse areas). The repulsion force(s) may be a function of distance between the points and may utilize a mathematical model to separate points as a function of their closeness or distance, which may decrease in a linear, exponential, or other function as the points are pushed apart.

For example, as application points are pushed apart to a greater distance, or the initial distance between application points is greater than between other neighboring points, the repulsion force(s) may also decrease with this increase in distance. Further, repulsion forces between different neighboring and/or associated application points may balance with other competing application points and their corresponding repulsion force. One or more repulsion forces may be modeled to replicate a force that would push two or more points apart with respect to each other one or more nearest neighbor application points in order to apply the repulsion forces between nearby application points. The repulsion forces may also or instead utilize a distance over the surface in an animation space to apply the repulsion forces between the application points. The repulsion forces between neighboring points are further shown with regard to FIG. 3.

In contrast to the uniform distribution of application points on first surface portion 204 and second surface portion 206, a third surface portion 208 may receive a different density or concentration of application points. For example, a density map may be applied over one or more surface of subdivision surface 202, which may change the relative density of distribution of application points over subdivision surface 202. A creature artist or other animator may provide or paint the density map over the surfaces of subdivision surface 202. Thus, third surface portion 208 includes a lower density of application points, shown as two application points.

In a similar fashion to first surface portion 204 and second surface portion 206, locations for assignment of the application points in third surface portion 208 may be determined using the scattering function or algorithm, which utilizes repulsion forces to push apart neighboring points and perform a more even distribution of application points. Thus, an application point 216 may be assigned a location on third surface portion 208 using the scattering function and repulsion forces with neighboring application points to push the application points apart from each other using one or more algorithmic repulsion functions or factors. However, it is understood more or less application points may also be assigned locations over first surface portion 204, second surface portion 206, and third surface portion 208.

Since the point density is less and distances may be farther on third surface portion 208, the repulsion force may be calculated with less "push" strength between neighboring points. In some embodiments, depending on the point density, the same or a different mathematical function for the repulsion force may be selected and used. The density map may also be used to designate a bald surface portion 210, where the density may be set at zero. However, in other embodiments, a paintable baldness UV mapping may be used in post-processing to designate bald surface portion 210 as a bald portion of subdivision surface 202. Thus, application points may be removed from bald surface portion 210 using the UV mapping.

Environment 200 might be implemented by software, interfaces, features and/or functionality of a computer system used by animators or others to specify details that can be used to generate computer-generated imagery such as images and sequences of video frames.

Figure 3:
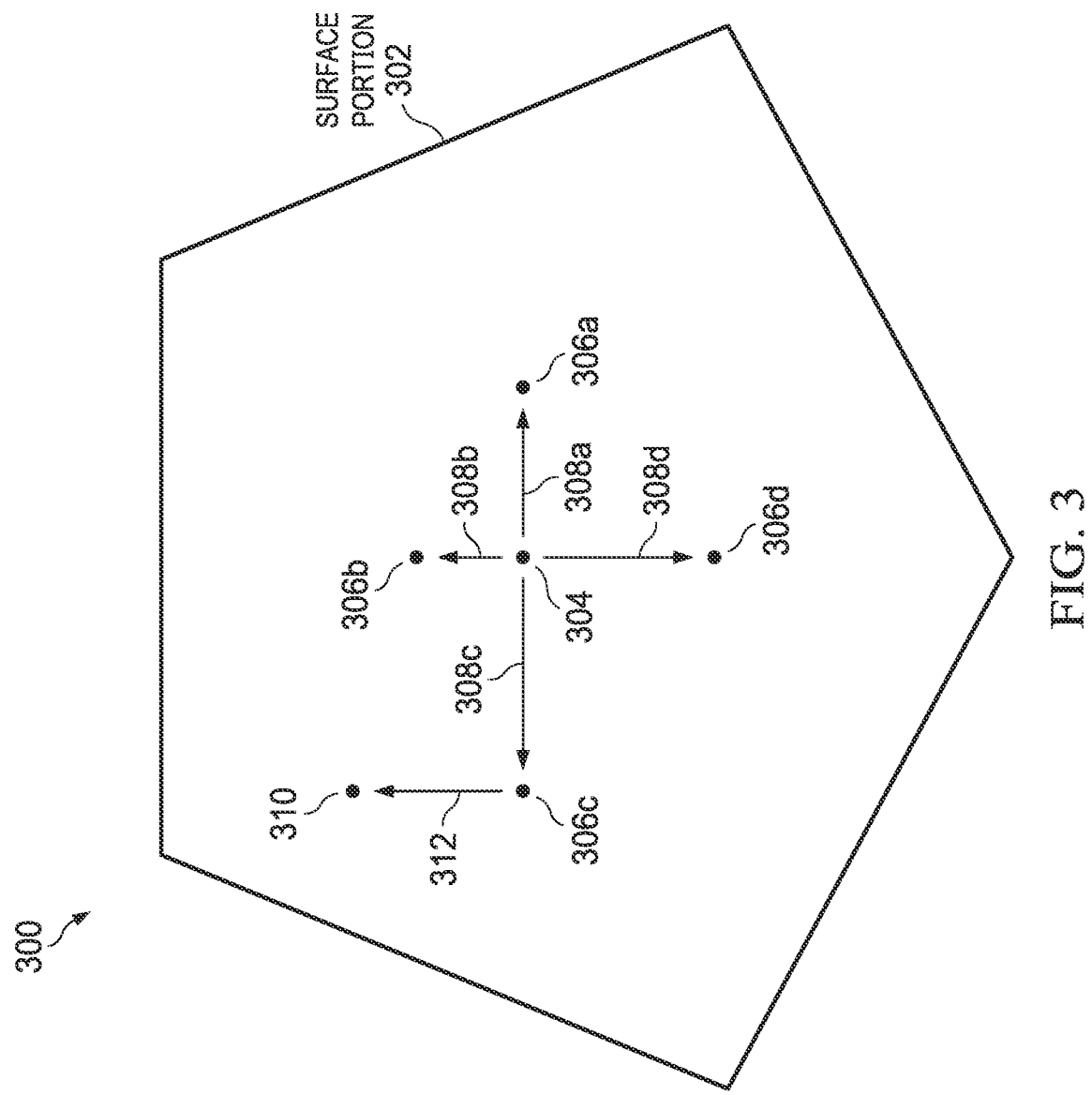
FIG. 3 illustrates an environment where application points may be scattered through repulsion forces with neighboring points, in an embodiment.

FIG. 3 illustrates an environment 300 where application points may be scattered through repulsion forces with neighboring points, in an embodiment. Environment 300 shows a surface portion 302 having application points, such as follicle points, distributed over the polygon face or surface of surface portion 302, which may correspond to a portion of subdivision surface 106 that represents target mesh 102 in environment 100. Thus, as illustrated there, environment 300 may be displayed by a computing device and computing display when animating a 3D creature, such as a human, animal, fictional creature, or the like. For example, the computing system may correspond to a computer animation and simulation system configured to animate external surface objects on a surface of a creature. The external surface objects may correspond to those objects that protrude from the surface of the creature, such as feathers, hairs, fur, and the like. When distributing and assigning application points to locations on surface portion 302, a scattering function or algorithm may be used to first distribute the application points, which may then use repulsion forces to cause a more even distribution of the application points over surface portion 302. Thus, in environment 300, the repulsion forces interacting between neighboring and/or nearby application points are shown.

On surface portion 302, an application point 304 is shown interacting with a neighboring point 306a, a neighboring point 306b, a neighboring point 306c, and a neighboring point 306d. Further a nearby application point 310 may also interact with one or more of application point 304 and/or neighboring points 306a-d. These may all interact through one or more repulsion forces, which correspond to functions or models to cause application points to be pushed apart when assigned locations over a subdivision surface. The repulsion force(s) may be creature specific, or may correspond to multiple different creatures, including creatures of the same or different type. Further, the repulsion forces may only interact with neighboring points, or may further interact with nearby points that may be further separated from each application point. For example, one or more nearest application point neighbors and/or a distance over the surface in an animation space may be considered to apply the repulsion forces between the application points. The repulsion forces may be applied as a mathematical function over the polygon surface for the particular application point or may be applied further over multiple polygon surfaces for a subdivision surface. For example, the repulsion force may push two points apart as a function of distance between those points, which may be linear, exponential, polynomial, or the like to affect different points over distances between the points.

Application point 304 is shown as interacting with neighboring points 306a-d through a repulsion force 308a, a repulsion force 308b, a repulsion force 308c, and a repulsion force 308d to assign locations of application point 304 and neighboring points 306a-d on surface portion 302. Repulsion forces 308a-d each may interact differently with application point 304 and neighboring points 306a-d for determination of the locations of assignment, such as based on a strength of repulsion forces 308a-d based on a relative distance of neighboring points 306a-d with application point 304. For example, neighboring point 306a and neighboring point 306d are shows as an about equal distance from application point 304, and therefore may have a relatively same or similar repulsion force 308a and repulsion force 308d, respectively, with application point 304. Therefore, application point 304 and neighboring points 308a and 308d may be pushed apart to a relatively same or similar distance or by a relatively same or similar strength.

However, neighboring point 306b is shown as scattered close to application point 304 from the corresponding random seed value or node for the scattering function. Thus, repulsion force 308b may be stronger and more strongly push apart application point 304 from neighboring point 306b. In contrast, neighboring point 306c is shown as furthest away from application point 304 from neighboring points 306a-c, and therefore may be the weakest push force to push apart application point 304 and neighboring point 306c. At a certain distance, the repulsion force may be weak enough or nonexistent due to the distance and the force's function or model for the repulsion force. Further, the repulsion force(s) designated for a particular scattering function may also consider other variables with or than distance in determination of the interacting force model that causes assignment of surface locations to application points.

Further, nearby point 310 is shown interacting with neighboring point 306c through a repulsion force 312. This may cause adjustment of neighboring point 306c and/or application point 304. In some embodiments, by causing a change in the location of assignment for neighboring point 306c (e.g., by pushing neighboring point 306c to a location relative to application point 304), the location of assignment for application point 304 may be changed. Thus, repulsion forces by nearby point 310 may also cause a change to location of assignment of application point 304 in some embodiments. Once the repulsion forces are applied, the locations to assign the application points shown in environment 300 may be determined and the points may be placed in a center of the plane for surface portion 302, where a simple box face may represent where each point is in a disjointed mesh for the subdivision surface.

During application of the repulsion forces shown in FIG. 3 (e.g., repulsion forces 308a-d and/or 312), the modeling system may perform one or more iterations of repulsion force application based on the repulsion force function. For example, one application of the repulsions forces may be sufficient to obtain a requisite uniform or semi-uniform but arbitrary distribution of application points over a particular mesh. However, by performing additional iterations of the repulsion force over the application points, a more uniform distribution of points may be achieved. In this regard, a number of iterations may be assigned based on the particular mesh, artist requirements, or the like. The number of iterations to calculate and apply the repulsion force(s) to the application points (e.g., to cause distribution of those application points over the mesh) may be configurable based on the modeling system. In some embodiments, when modeling the application points over the target mesh, 1, 10, 50, or 100 iterations of application of the repulsion force(s) during point distribution may be applied in order to achieve the requisite application point distribution.

Figure 4:
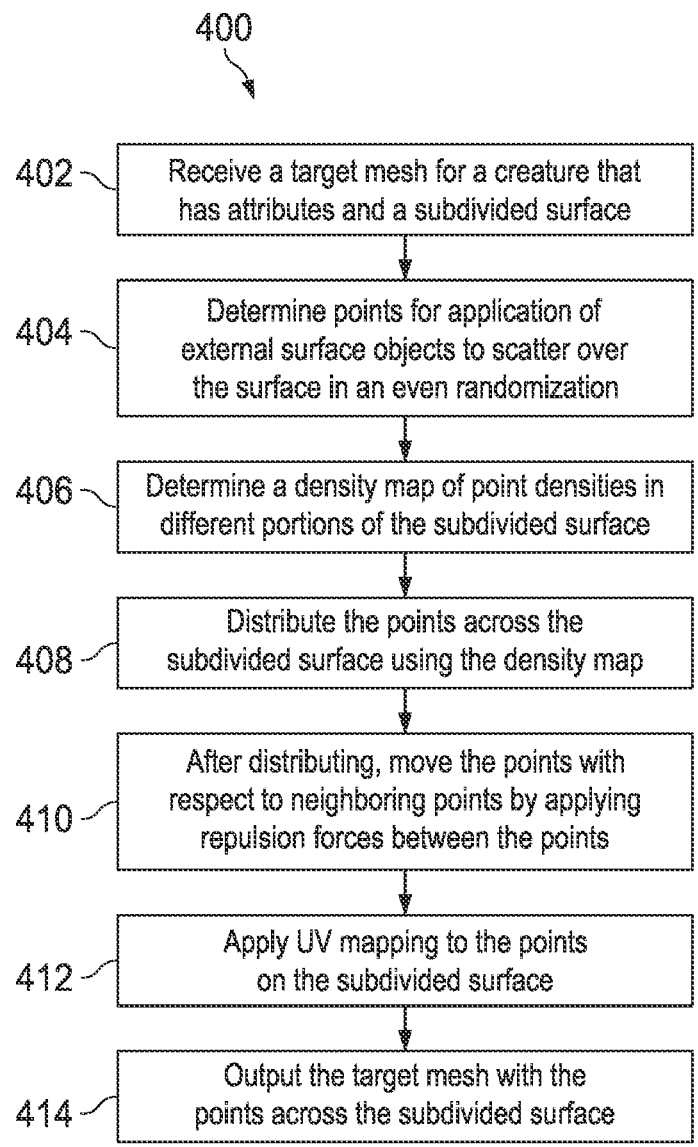
FIG. 4 is a flowchart of an exemplary method as might be performed by computing system when modeling a 3D image and/or animation of a creature having application points for placement of external surface objects, in an embodiment.

FIG. 4 is a flowchart 400 of an exemplary method as might be performed by computing system when modeling a 3D image and/or animation of a creature having application points for placement of external surface objects, in an embodiment. Note that one or more steps, processes, and methods described herein of flowchart 400 may be omitted, performed in a different sequence, or combined as desired or appropriate.

In step 402 of flowchart 400, a target mesh for a creature that has attributes and a subdivision surface is received. The target mesh may be represented by the subdivision surface having a polygonal mesh of polygons, which allows for placement of application points and/or painting of density and baldness UV maps over surfaces of the subdivision surface. The target mesh may have attributes that allow for bind-pose and active attributes of the mesh so that position calculations of the mesh do not need to be performed during animation. Points for application of external surface objects, such as follicle points, to scatter over the surface in an even randomization are determined at step 404. For example, a point count may be designated by a creature artist or animator for a particular 3D animated creature, which may include a pelt, hide, fur, or groom of a character or creature. The point count may therefore be used to create an application point set that is then to be distributed over the subdivision surface. These points may correspond to application points, follicle points, or other nodes that may be used to attach and/or place an external surface object on a surface in a 3D animation.

At step 406, a density map of point densities in different portions of the subdivision surface is determined. The density map may be used to pull more or less points into specific areas of the subdivision surface, such as an area corresponding to a limb, appendage, head, or other area of the subdivision surface representing a creature or a portion of a creature or other object (including accessories, clothing, or the like worn by, on, or attached to the creature). The density map may be painted over the surface by the creature artist and/or animator and may specifically designate the application points to pull into areas of the surface. This may relatively assign such densities or concentrations (e.g., higher or lower, and degree of change, than another area, including adjacent areas) over the surface. However, a density map may not be required where uniform or semi-uniform point placement over the entire surface is desired.

At step 408, the points are distributed, such as scattered, across the subdivision surface using the density map, for example, by using a random seed value with a scattering function to initially assign locations of the application points over the surface. This scattering function may provide a randomized placement of the application points over the corresponding subdivision surface. In various embodiments, a change to the density map may be received and the points scattered across the subdivision surface may be adjusted using the change to the density map without re-spreading points using the one or more repulsion forces. For example, this may include receiving the change to the density map and using the change to determine a rescattering zone that is less than the entire surface. Thereafter, the application points may be scattered within the rescattering zone using the change to the density map, while positioning of at least one point outside the rescattering zone is independent of the rescattering.

At step 410, after distributing, the points are moved with respect to neighboring (and/or nearby) points by applying repulsion forces between the points. These repulsion forces correspond to a mathematical function or model that attempts to replicate a repulsion force between two points to push those points apart. For example, the repulsion force may push two points apart as a function of distance between those points, which may be linear, exponential, or otherwise decrease as distance increases (thereby increasing at closer distances). Further, the repulsion forces may operate with respect to their nearest application point neighbor or neighbors in order to apply the repulsion forces between application points. The repulsion forces may also or instead consider a proximity distance over the surface in an animation space to apply the forces between the application points. Once applied, the points are assigned locations on the subdivision surface with location parameters. At step 412, a UV mapping is applied to points on the subdivision surface, such as a paintable baldness UV mapping. This allows for removal of points in areas of the subdivision surface where the points are unwanted. However, step 412 may be optional in that certain creature may not have baldness portions. At step 414, the target mesh is output with the points across the subdivision surface. This may include providing a disjointed mesh with a point represented as a box face and the original point origin in a center of a plane for the subdivision surface.

Figure 5:
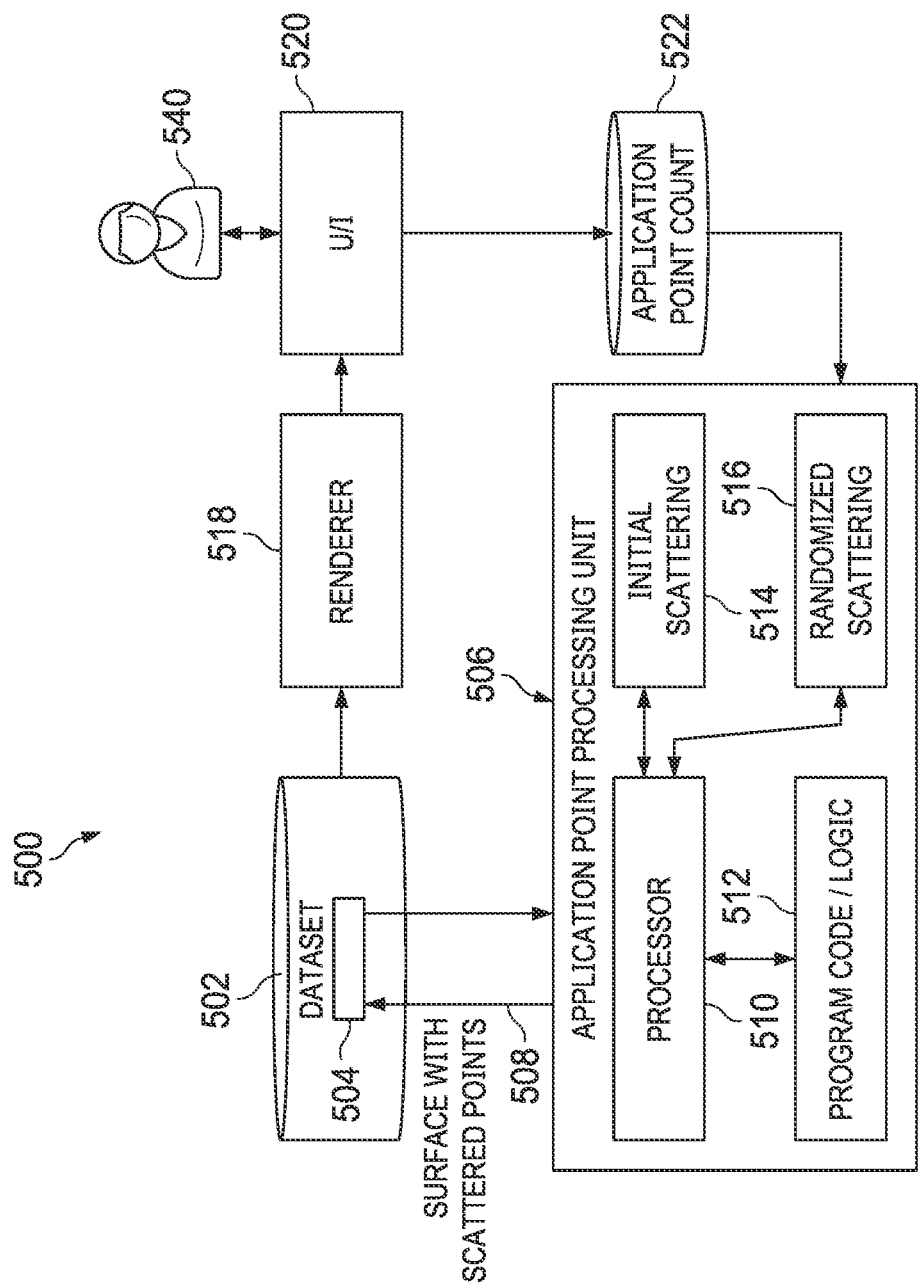
FIG. 5 is a system for utilizing application points that have been scattered in an arbitrary but even manner through repulsion forces in a computer animation, in an embodiment.

FIG. 5 illustrates a system 500 for utilizing application points that have been scattered in a randomized but even manner through repulsion forces in a computer animation, in an embodiment. System 500 includes a dataset 502, an application point processing unit 506, a renderer 518, a user interface (UI) 520, and an application point count 522.

A user 540 may interact with the UI 520 to access, load, and/or define one or more surfaces for which application point may be assigned locations over the surface(s) based on application point count 522 and a scattering algorithm or function that utilizes repulsion forces to randomize but evenly spread the application points. A surface may therefore be pre-generated or may be generated by user 540 when performing the methods and/or processes described herein for application point scattering over surfaces. Application point count 522 may indicate, for example, a number or count for an application point set to be assigned locations over a surface in a 2D or 3D space, which may include surfaces stored by dataset 502. Application point count 522 may include, for example, a number of points or the like in a virtual space corresponding to the surface that are used as application points for assignment of fibers or other surface objects. This may include disposing application point count 522 over the surface. Dataset 502 may store data for different surfaces, including a stored surface 504, that may be stored and/or loaded (e.g., characters, creatures, or objects). Dataset 502 may load data available to user 540 via UI 520 from a source of an animation stored by dataset 502, such as a tessellated mesh, subdivision surface, or the like, which is used to define a surface. Further dataset 502 may include fibers to use with application points spread over a surface (e.g., a pelt, feather groom, coat, robe, cloak, etc.). Thus, in some embodiments, application point count 522 may be placed over or nearby stored surface 504 loaded to UI 520 from dataset 502.

Application point processing unit 506 may utilize the methods and processes described herein to take application point count 522 with any additional surface data from dataset 502 and/or user 540, and thereafter perform the scattering operations herein for those application points when assigning locations over the surface. This may generate a uniform or semi-uniform placement and/or scattering of the application point set over the corresponding surface based on application point count 522 in a randomized manner, for example, based on repulsion forces to assign the application point locations. Application point processing unit 506 may calculate and generate initial scattering 514 for the surface using a scattering algorithm and/or a randomized seed value, as well as any assigned density map to push or pull more or less application points to particular areas on the surface. Initial scattering may correspond to a scattering of application point count 522 over the surface prior to applying repulsion forces between application point count 522, as described herein. Further, the finalized placement and/or assignment of points from initial scattering 514 with respect to application point count 522 may be used with the repulsion forces to generate randomized scattering 516, as described herein. This allows for the uniform or semi-uniform but randomized assignment of application points to placements over the corresponding surface.

Application point processing unit 506 includes a processor 510 that executes program code 512 to take as input application point count 522 with a surface, calculate initial scattering 514, and use initial scattering 514 to calculate randomized scattering 516. Application point processing unit 506 may further store surface with scattered points 508 for a specific surface and application point count 522 to dataset 502 so that the corresponding randomized scattering 516 may be retrieved and/or used. This includes use with renderer 518 when rendering a scene having the surface and corresponding application points, fibers, and/or attached external objects over the surface. For example, application point processing unit 506 may initiate the process by taking application point count 522 with any additional data from dataset 502, and thereafter determining randomized scattering 516 through initial scattering 514, which may include those determined from repulsion forces between neighboring and/or associated application points. Based on randomized scattering 516, application point processing unit 506 may then provide any fibers and/or external objects attached to application points over a surface using surface with scattered points 508 stored by dataset 502. This allows for reproduction of the corresponding surface based on randomized scattering 516. Application point processing unit 506 may then move to the next surface and application point counts designated by user 540 and further perform additional application point scattering as requested. The resulting surfaces, fibers, and the like that have been animated and stored by dataset 502 may further be rendered by rendered 518 and/or output to user 540 to inspect the results.

Figure 6:
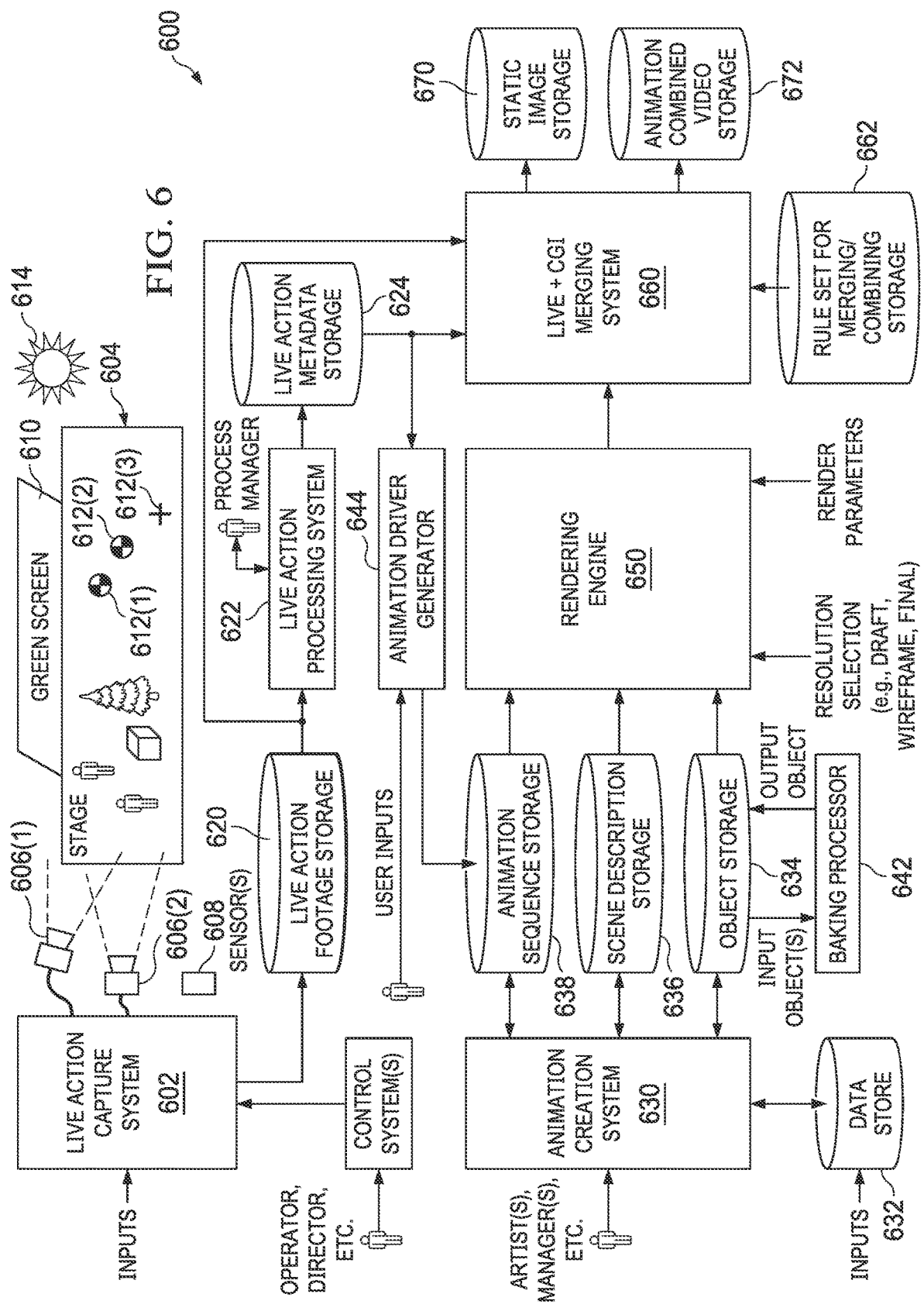
FIG. 6 illustrates an example visual content generation system as might be used to generate imagery in the form of still images and/or video sequences of images, according to various embodiments.

In this regard, the target mesh of the subdivision surface may be used to render a character, creature, or object within an animation and rendering system, such as the visual content generation system 600 of FIG. 6. The target mesh may correspond to different polygons, bicubics, non-uniform rational basis splines (NURBS), an implicit surface, and/or a network of NURBS patches, which, when constructed according to the subdivision rules in a subdivision library may create the target mesh. Using the subdivision rules, a collection of interconnected vertices, edges, and faces may be determined, and the subdivision rules may describe how a target mesh can be created which will have more vertices, edges, and faces. When constructed, this may approach a subdivision limit surface that is used during rendering to correctly render and display the corresponding character, creature, or object. Thus, using the subdivision rules, placement of the application points may be determined in the manner described herein, where when the subdivision limit surface with randomized but uniformly spread application is created and provided to the rendering system (e.g., see FIG. 6), a rendering may be determined for use with a computer animation and rendering system.

For example, the visual content generation system 600 (see FIG. 6) is configured to receive the values for creature generation and animation in environments 100, 200, and 300 as input and output one or more static images and/or one or more animated videos. The static image(s) and/or the animated video(s) include one or more visual representations of a creature having a feather groom, hide, pelt, hair, coat, or the like. For example, FIG. 6 illustrates the example visual content generation system 600 as might be used to generate imagery in the form of still images and/or video sequences of images from a target mesh having randomized but uniformly scattered application points using subdivision rules, libraries, and limit surfaces. The visual content generation system 600 might generate imagery of live action scenes, computer generated scenes, or a combination thereof. In a practical system, users are provided with tools that allow them to specify, at high levels and low levels where necessary, what is to go into that imagery. For example, a user might be an animation artist, such as a creature artist generating and animating the creature's manifolds and corresponding external objects in environments 100, 200, and 300, and might use the visual content generation system 600 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 600 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a compressed format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 6, a live action capture system 602 captures a live scene that plays out on a stage 604. Live action capture system 602 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 606(1) and 606(2) capture the scene, while in some systems, there might be other sensor(s) 608 that capture information from the live scene (e.g., infrared cameras, infrared sensors, motion capture ("mo-cap") detectors, etc.). On stage 604, there might be human actors, animal actors, inanimate objects, background objects, and possibly an object such as a green screen 610 that is designed to be captured in a live scene recording in such a way that it is easily overlaid with computer-generated imagery. Stage 604 might also contain objects that serve as fiducials, such as fiducials 612(1)-(3), that might be used post-capture to determine where an object was during capture. A live action scene might be illuminated by one or more lights, such as an overhead light 614.

During or following the capture of a live action scene, live action capture system 602 might output live action footage to a live action footage storage 620. A live action processing system 622 might process live action footage to generate data about that live action footage and store that data into a live action metadata storage 624. Live action processing system 622 might include computer processing capabilities, image processing capabilities, one or more processors, program code storage for storing program instructions executable by the one or more processors, as well as user input devices and user output devices, not all of which are shown. Live action processing system 622 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 614, as that might be useful in post-processing to match computer-generated lighting on objects that are computer-generated and overlaid on the live action footage. Live action processing system 622 might operate autonomously, perhaps based on predetermined program instructions, to generate and output the live action metadata upon receiving and inputting the live action footage. The live action footage can be camera-captured data as well as data from other sensors.

An animation creation system 630 is another part of visual content generation system 600. Animation creation system 630 might include computer processing capabilities, image processing capabilities, one or more processors, program code storage for storing program instructions executable by the one or more processors, as well as user input devices and user output devices, not all of which are shown Animation creation system 630 might be used by animation artists, managers, and others to specify details, perhaps programmatically and/or interactively, of imagery to be generated. From user input and data from a database or other data source, indicated as a data store 632, animation creation system 630 might generate and output data representing objects (e.g., a horse, a human, a ball, a teapot, a cloud, a light source, a texture, etc.) to an object storage 634, generate and output data representing a scene into a scene description storage 636, and/or generate and output data representing animation sequences to an animation sequence storage 638.

Scene data might indicate locations of objects and other visual elements, values of their parameters, lighting, camera location, camera view plane, and other details that a rendering engine 650 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 630 might be interactive, allowing a user to read in animation sequences, scene descriptions, object details, etc. and edit those, possibly returning them to storage to update or replace existing data. As an example, an operator might read in objects from object storage into a baking processor 642 that would transform those objects into simpler forms and return those to object storage 634 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 632 might be used to drive object presentation. For example, if an artist is creating an animation of a spaceship passing over the surface of the Earth, instead of manually drawing or specifying a coastline, the artist might specify that animation creation system 630 is to read data from data store 632 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 644 might read in live action metadata, such as data representing movements and positions of body parts of a live actor during a live action scene. Animation driver generator 644 might generate corresponding animation parameters to be stored in animation sequence storage 638 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 622. Animation driver generator 644 might convert that movement data into specifications of how joints of an articulated CGI character are to move over time.

A rendering engine 650 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 650 might include computer processing capabilities, image processing capabilities, one or more processors, program code storage for storing program instructions executable by the one or more processors, as well as user input devices and user output devices, not all of which are shown.

Visual content generation system 600 can also include a merging system 660 that merges live footage with animated content. The live footage might be obtained and input by reading from live action footage storage 620 to obtain live action footage, by reading from live action metadata storage 624 to obtain details such as presumed segmentation in captured images segmenting objects in a live action scene from their background (perhaps aided by the fact that green screen 610 was part of the live action scene), and by obtaining CGI imagery from rendering engine 650.

A merging system 660 might also read data from rulesets for merging/combining storage 662. A very simple example of a rule in a ruleset might be "obtain a full image including a two-dimensional pixel array from live footage, obtain a full image including a two-dimensional pixel array from rendering engine 650, and output an image where each pixel is a corresponding pixel from rendering engine 650 when the corresponding pixel in the live footage is a specific color of green, otherwise output a pixel value from the corresponding pixel in the live footage."

Merging system 660 might include computer processing capabilities, image processing capabilities, one or more processors, program code storage for storing program instructions executable by the one or more processors, as well as user input devices and user output devices, not all of which are shown. Merging system 660 might operate autonomously, following programming instructions, or might have a user interface or programmatic interface over which an operator can control a merging process. In some embodiments, an operator can specify parameter values to use in a merging process and/or might specify specific tweaks to be made to an output of merging system 660, such as modifying boundaries of segmented objects, inserting blurs to smooth out imperfections, or adding other effects. Based on its inputs, merging system 660 can output an image to be stored in a static image storage 670 and/or a sequence of images in the form of video to be stored in an animated/combined video storage 672.

Thus, as described, visual content generation system 600 can be used to generate video that combines live action with computer-generated animation using various components and tools, some of which are described in more detail herein. While visual content generation system 600 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data that includes image data having shadow details generated using the methods described herein. The carrier medium can comprise any medium suitable for carrying the image data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 7:
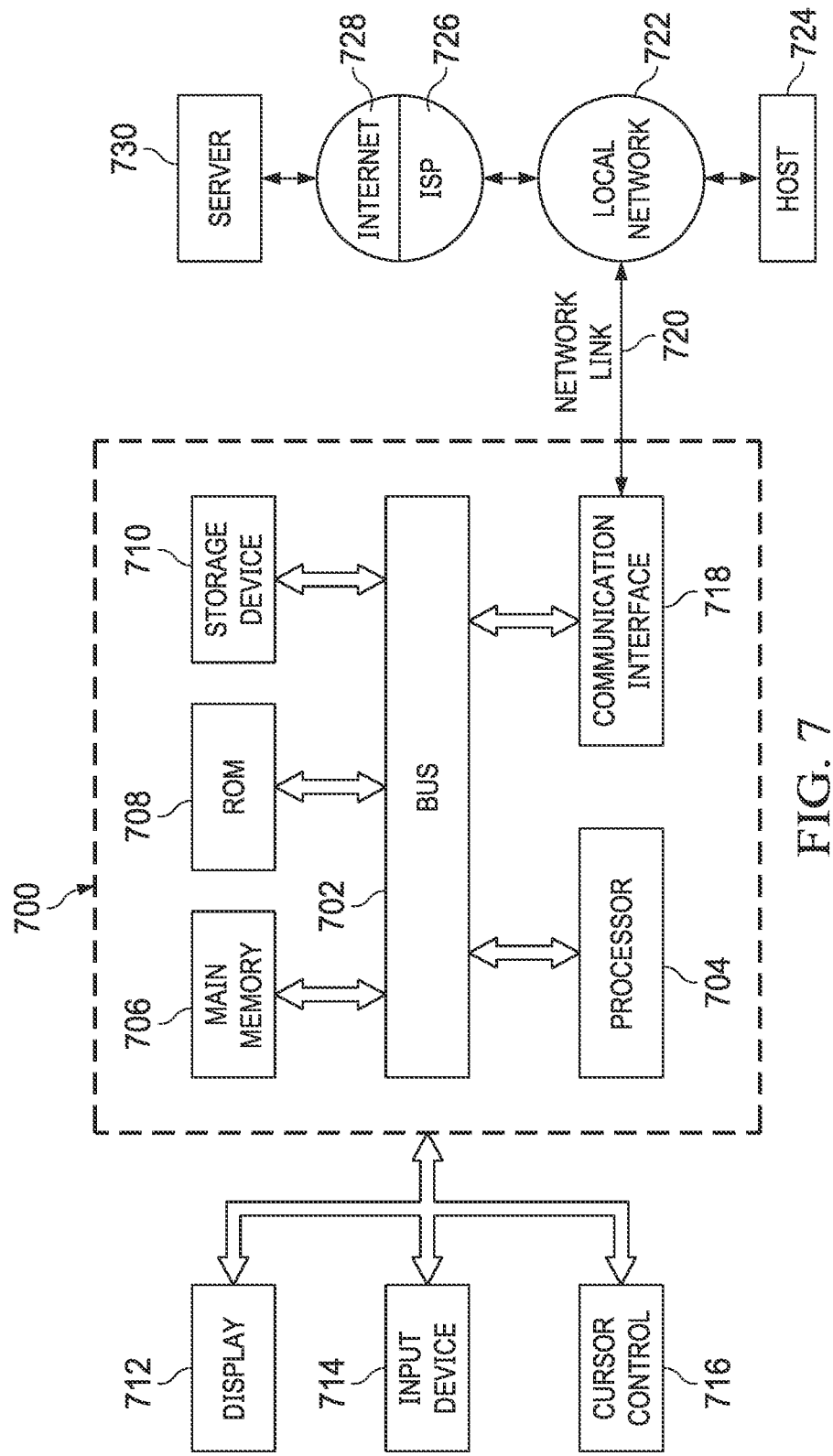
FIG. 7 is a block diagram illustrating an example computer system upon which computer systems of the systems illustrated in FIGS. 1 and 5 may be implemented.

For example, FIG. 7 is a block diagram that illustrates a computer system 700 upon which the computer systems of the systems described herein and/or visual content generation system 600 (see FIG. 6) may be implemented. Computer system 700 includes a bus 702 or other communication mechanism for communicating information, and a processor 704 coupled with bus 702 for processing information. Processor 704 may be, for example, a general-purpose microprocessor.

Computer system 700 also includes a main memory 706, such as a random-access memory (RAM) or other dynamic storage device, coupled to bus 702 for storing information and instructions to be executed by processor 704. Main memory 706 may also be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a computer monitor, for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a network connection. A modem or network interface local to computer system 700 can receive the data. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be a network card, a modem, a cable modem, or a satellite modem to provide a data communication connection to a corresponding type of telephone line or communications line. Wireless links may also be implemented. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic, or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720, and communication interface 718. In the Internet example, a server 730 might transmit a requested code for an application program through the Internet 728, ISP 726, local network 722, and communication interface 718. The received code may be executed by processor 704 as it is received, and/or stored in storage device 710, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for programmatic arbitrary distribution of items in a modeling system, the method comprising:
    under the control of one or more computer systems configured with executable instructions:
        receiving a surface having one or more surface attributes;
        determining a point count, wherein an application point is associated with a location on the surface and the point count is a count of such application points in an application point set;
        applying a density map over the surface to assign a density to each of a plurality of portions of the surface wherein at least two of the portions are assigned different densities;
        assigning application points of the application point set to locations on the surface according to the density map and a scattering function, wherein the scattering function is based on one or more repulsion forces, effects of which are modeled as to a first application point and as to one or more neighbor points neighboring the first application point, wherein the one or more repulsion forces are treated as pushing each of the first application point and the one or more neighbor points apart; and
        providing the surface having the application points of the application point set scattered across the surface based on the one or more repulsion forces.

2. The computer-implemented method of claim 1, further comprising:
    receiving a change to the density map for the points across the surface;

determining a rescattering zone that is less than an entirety of the surface based on the change; and rescattering the application points scattered within the rescattering zone using the change to the density map, wherein positioning of at least one of the application points outside the rescattering zone is independent of the rescattering.

3. The computer-implemented method of claim 1, wherein scattering the points across the surface comprises distributing the points across the surface using a resettable seed value prior to applying the one or more repulsion forces, and wherein the resettable seed value is changeable over at least one of the surface or an additional surface for the scattering function.

4. The computer-implemented method of claim 1, wherein prior to providing the surface, the method further comprises:

obtaining a UV mapping comprising vertex data within the surface; and mapping the UV mapping to vertex space for the surface using the vertex data.

5. The computer-implemented method of claim 4, further comprising:

assigning objects to application points of the application point set, wherein an object is attached to an application point at an object location on the surface for the application point;

obtaining a texture mapping for the UV mapping and comprising a texture to apply to a portion of the surface using the UV mapping; and applying the texture mapping over the portion using the mapping of the UV mapping to the vertex space.

6. The computer-implemented method of claim 5, wherein the UV mapping comprises a paintable baldness map and the portion comprises a baldness portion among the plurality of portions of the surface, and wherein the applying the texture mapping comprises remove a subset of the points for the baldness portion of the surface.

7. The computer-implemented method of claim 5, wherein the applying the texture mapping is further based on a nearby portion of the surface.

8. The computer-implemented method of claim 1, wherein the one or more repulsion forces are applied across the surface to generate an approximately even distribution of the points in the surface based on the density map.

9. The computer-implemented method of claim 1, wherein the scattering function provides a random placement or uniform placements of the application points, and wherein the one or more repulsion forces are applied relatively by each point against the one or more neighbor points based on a distance between the points and the one or more neighbor points.

10. The computer-implemented method of claim 1, wherein the density map comprises at least one of a static placement, random placement, or artist-value placement for different portions of the surface, and/or wherein the surface comprises one of a subdivision surface of polygons, a bicubic surface, a non-uniform rational basis spline (NURBS) surface, an implicit surface, or a network of NURBS patches.

11. The computer-implemented method of claim 1, wherein the assigning the application points of the application point set to the locations comprises applying the repulsion forces of the scattering function a set number of iterations to the application points over the surface during the assigning.

12. A system comprising: at least one processor, and a storage medium storing instructions, which when executed by the at least one processor, cause the system to implement the computer-implemented method of claim 1.

13. A non-transitory computer-readable storage medium storing instructions, which when executed by at least one processor of a computer system, causes the computer system to carry out the computer-implemented method of claim 1.

14. A non-transitory computer-readable medium carrying instructions, which when executed by at least one processor of a computer system, causes the computer system to carry out the computer-implemented method of claim 1.

15. A carrier medium carrying image data that includes pixel information generated according to the computer-implemented method of claim 1.

16. A computer system for evenly randomized distribution of points on a surface in a modeling system, the computer system comprising:

at least one processor; and a computer-readable medium storing instructions, which when executed by the at least one processor, causes the computer system to perform operations comprising:

receiving a surface having one or more surface attributes, wherein the surface comprises a surface;

determining a point count, wherein an application point is associated with a location on the surface and the point count is a count of such application points in an application point set;

applying a density map over the surface to assign a density to each of a plurality of portions of the surface wherein at least two of the portions are assigned different densities;

assigning application points of the application point set to locations on the surface according to the density map and a scattering function, wherein the scattering function is based on one or more repulsion forces, effects of which are modeled as to a first application point and as to one or more neighbor points neighboring the first application point, wherein the one or more repulsion forces are treated as pushing each of the first application point and the one or more neighbor points apart; and providing the surface having the application points of the application point set scattered across the surface based on the one or more repulsion forces.

17. The computer system of claim 16, wherein the operations further comprise:

receiving a change to the density map for the points across the surface;

determining a rescattering zone that is less than an entirety of the surface based on the change; and rescattering the application points scattered within the rescattering zone using the change to the density map, wherein positioning of at least one of the application points outside the rescattering zone is independent of the rescattering.

18. The computer system of claim 16, wherein scattering the points across the surface comprises distributing the points across the surface using a resettable seed value prior to applying the one or more repulsion forces, and wherein the resettable seed value is changeable over at least one of the surface or an additional surface for the scattering function.

19. The computer system of claim 16, wherein prior to providing the surface, the operations further comprise:

obtaining a UV mapping comprising vertex data within the surface; and mapping the UV mapping to vertex space for the surface using the vertex data.

20. The computer system of claim 19, wherein the operations further comprise:

assigning objects to application points of the application point set, wherein an object is attached to an application point at an object location on the surface for the application point;

obtaining a texture mapping for the UV mapping and comprising a texture to apply to a portion of the surface using the UV mapping; and applying the texture mapping over the portion using the mapping of the UV mapping to the vertex space, wherein the UV mapping comprises a paintable baldness map and the portion comprises a baldness portion among the plurality of portions of the surface, and wherein the applying the texture mapping comprises remove a subset of the points for the baldness portion of the surface.

21. The computer system of claim 16, wherein the surface comprises one of a subdivision surface of polygons, a bicubic surface, a non-uniform rational basis spline (NURBS) surface, an implicit surface, or a network of NURBS patches.

* * * * *